(12) United States Patent
Takeuchi et al.

(10) Patent No.: US 10,777,111 B2
(45) Date of Patent: Sep. 15, 2020

(54) DISPLAY DEVICE

(71) Applicant: SHARP KABUSHIKI KAISHA, Sakai, Osaka (JP)

(72) Inventors: Yohei Takeuchi, Sakai (JP); Takuya Watanabe, Sakai (JP); Akira Tagawa, Sakai (JP); Yasuaki Iwase, Sakai (JP); Takatsugu Kusumi, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/387,324

(22) Filed: Apr. 17, 2019

(65) Prior Publication Data

US 2019/0325799 A1  Oct. 24, 2019

(30) Foreign Application Priority Data

Apr. 19, 2018  (JP) .................. 2018-080408

(51) Int. Cl.
*G09G 3/02* (2006.01)
*G09G 3/36* (2006.01)
*G02F 1/1343* (2006.01)
*G02F 1/1362* (2006.01)

(52) U.S. Cl.
CPC ....... *G09G 3/025* (2013.01); *G02F 1/134309* (2013.01); *G02F 1/136286* (2013.01); *G09G 3/3648* (2013.01)

(58) Field of Classification Search
CPC .... G09G 3/025; G09G 3/3258; G09G 3/3275; G09G 3/3648; G09G 2300/0426; G09G 2300/0439; G02F 1/134309; G02F 1/13624; G02F 1/136286; G02F 1/1368; G02F 2001/134345; G02F 2001/134354
See application file for complete search history.

(56) References Cited

U.S. PATENT DOCUMENTS

| | | | | |
|---|---|---|---|---|
| 6,909,409 B2* | 6/2005 | Tanada | .................. | H01L 27/127 345/51 |
| 7,403,179 B2* | 7/2008 | Koyama | .............. | G09G 3/2022 345/76 |
| 2001/0002703 A1* | 6/2001 | Koyama | .............. | G09G 3/3275 257/40 |
| 2001/0048106 A1* | 12/2001 | Tanada | ................. | G09G 3/3225 257/66 |

(Continued)

FOREIGN PATENT DOCUMENTS

JP 2009-224869 A 10/2009

*Primary Examiner* — Tom V Sheng
(74) *Attorney, Agent, or Firm* — ScienBiziP, P.C.

(57) ABSTRACT

A plurality of pixel formation portions in an image display portion are grouped so that K pixel formation portions form each pixel group, where K is an integer of two or more. The K pixel formation portions forming each of the pixel groups are connected to the same source bus line. Each of the pixel formation portions is provided with a connection control transistor configured to control an electrical connection state between the corresponding source bus line and a pixel electrode. The K connection control transistors included in the K pixel formation portions forming each of the pixel groups become an On state in periods different from one another. A source driver applies a video signal to each of the source bus lines in a time division manner in each horizontal scanning period.

6 Claims, 10 Drawing Sheets

(56) References Cited

U.S. PATENT DOCUMENTS

| | | | |
|---|---|---|---|
| 2008/0068516 A1* | 3/2008 | Mori | G09G 3/3648 |
| | | | 348/790 |
| 2009/0273388 A1 | 11/2009 | Yamashita | |
| 2009/0279007 A1* | 11/2009 | Shih | G09G 3/3655 |
| | | | 349/37 |
| 2012/0007843 A1* | 1/2012 | Hoshino | G02F 1/134336 |
| | | | 345/204 |
| 2012/0086743 A1* | 4/2012 | Shiomi | G02F 1/136213 |
| | | | 345/694 |
| 2013/0050130 A1* | 2/2013 | Brown | G06F 3/044 |
| | | | 345/174 |
| 2013/0321492 A1* | 12/2013 | Tanaka | G09G 3/3655 |
| | | | 345/690 |
| 2015/0355517 A1* | 12/2015 | Huang | H01L 27/1244 |
| | | | 257/72 |
| 2017/0186372 A1* | 6/2017 | Yanase | G09G 3/3233 |
| 2018/0299737 A1* | 10/2018 | Shimoshikiryoh | G02F 1/1368 |
| 2018/0315383 A1* | 11/2018 | Shimoshikiryoh | G09G 3/3607 |

* cited by examiner

DISPLAY DEVICE

BACKGROUND OF THE INVENTION

1. Field of the Invention

The following disclosure relates to a display device, and particularly to a display device configured to drive video signal lines in a time division manner.

2. Description of Related Art

Figure 10:
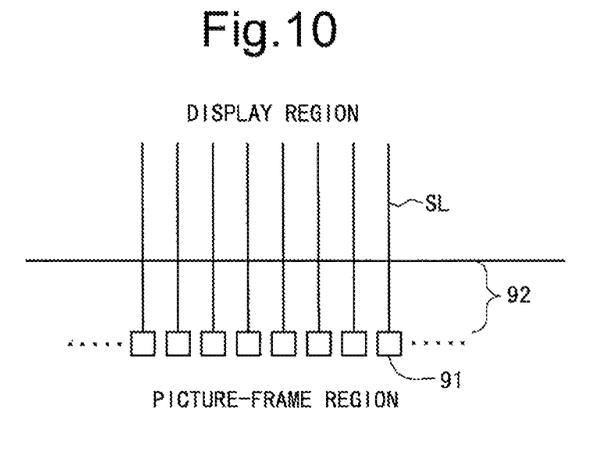
FIG. 10 is a diagram for describing the picture-frame region.

With regard to a display device, in recent years, development of high resolution/high definition has been remarkable. In order to implement the high resolution, it is necessary to increase video signal lines (source bus lines) configured to transmit video signals in number. With regard to this, for example, in a general liquid crystal display device, the video signals are supplied to the video signal lines in a display region by a source driver mounted in a picture-frame region in a form of an IC chip or the like. Therefore, when the high resolution is developed, it is necessary to provide a huge number of pads (pads configured to input the video signal from the source driver to the display region) 91 in a region where the source driver is mounted (see FIG. 10). Moreover, a region 92 for wiring from the pads 91 to the display region needs to be secured. From the foregoing, as the high resolution has been developed, there arises a need for enlarging the picture-frame region, thereby decreasing a freedom degree of design.

In light of the above-described situation, there has been proposed a driving method in which video signal lines are grouped by setting two or more video signal lines as one group, and one output terminal (pad) of a source driver is assigned to the plurality of video signal lines configuring each group to drive the plurality of video signal lines configuring each of the groups in a time division manner in each horizontal scanning period. The above-described driving method is called an "SSD method". Note that SSD is an abbreviation of "Source Shared Driving". The above-described SSD method is implemented by providing a demultiplexer circuit between the output terminal of the source driver and the video signal lines. An invention of such a liquid crystal display device employing the SSD method has been disclosed in, for example, Japanese Laid-Open Patent Publication No. 2009-224869. Since employing the SSD method reduces a number of the output terminals required for the source driver, a picture-frame region can be narrowed.

However, according to a liquid crystal display device disclosed in Japanese Laid-Open Patent Publication No. 2009-224869, a great number of switching elements (TFTs) configuring the demultiplexer circuit are provided in the picture-frame region. The existence of these great number of switching elements hinders improvement in the freedom degree of design. Moreover, particularly, in recent years, a display device having a shape other than a rectangular shape, such as a display device for vehicle, has been increasingly demanded. From this point of view, the realization of narrowing of the picture-frame region has been strongly demanded so that the freedom degree of design of the display device is improved.

SUMMARY OF THE INVENTION

Consequently, an object of the following disclosure is to realize narrowing of a picture-frame region so that a freedom degree of design is improved with regard to a display device.

Display devices according to several embodiments are each a display device including: a plurality of video signal lines; a plurality of scanning signal lines intersecting with the plurality of video signal lines; an image display portion including a plurality of pixel formation portions each connected to one of the plurality of video signal lines and one of the plurality of scanning signal lines; a video signal line drive circuit configured to apply video signals to the plurality of video signal lines; and a scanning signal line drive circuit configured to apply scanning signals to the plurality of scanning signal lines, wherein the plurality of pixel formation portions are grouped so that K pixel formation portions form each pixel group, where K is an integer of two or more, the K pixel formation portions forming each of the pixel groups are connected to the same video signal line, each of the pixel formation portions includes:
  a pixel electrode as one of electrodes forming a capacitance; and
  a connection control transistor configured to control an electrical connection state between a corresponding video signal line and the pixel electrode, K connection control transistors included in the K pixel formation portions forming each of the pixel groups become an On state in periods different from one another, and the video signal line drive circuit applies the video signals to each of the video signal lines in a time division manner in each horizontal scanning period.

According to the above-described configuration, the K pixel formation portions form the one pixel group, where K is an integer of two or more, and the K pixel formation portions forming each of the pixel groups are connected to a same video signal line. Moreover, each of the pixel formation portions includes the connection control transistor configured to control the electrical connection state between a corresponding video signal line and the pixel electrode. In such a configuration, K connection control transistors included in the K pixel formation portions forming each of the pixel groups become an On state in periods different from one another. This allows desired charging to be performed to the K pixel formation portions forming each of the pixel groups by the video signal applied to one video signal line. Here, the connection control transistors configured to function so as to assign the video signal are provided inside the image display portion, so that it is not required to provide switching elements (transistors or the like) configured to assign the video signal in a picture-frame region. Accordingly, with regard to the display device configured to perform the time-division driving of the video signal lines, the picture-frame region can be made narrower than that in the related art. That is, high resolution of the display device can be realized without deteriorating a freedom degree of design. As described above, with regard to the display device, the narrowing of the picture-frame region can be realized so that the freedom degree of design is improved.

These and other objects, features, aspects, and effects of the present invention will be made more clear from the following detailed description of the present invention with reference to the accompanying drawings.

DETAILED DESCRIPTION OF PREFERRED EMBODIMENTS

Hereinafter, preferred embodiments will be described. Note that with regard to an n-channel transistor, one of a drain and a source with a higher potential is called a drain, but in the description of the present specification, since one is defined as a drain and the other as a source, a source potential may be higher than a drain potential. Moreover, a gate terminal corresponds to a control terminal, and a drain terminal corresponds to a first conduction terminal, and a source terminal corresponds to a second conduction terminal.

1. First Embodiment

<1.1 Overall Configuration and Overview of Operation>

Figure 2:
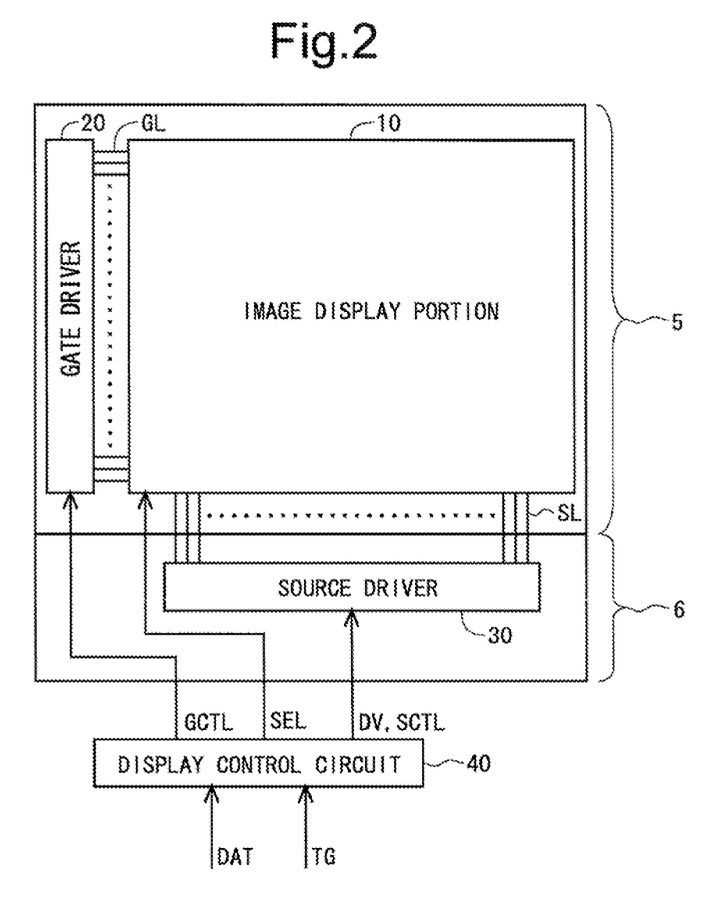
FIG. 2 is a block diagram showing an overall configuration of a liquid crystal display device according to the first embodiment.

FIG. 2 is a block diagram showing an overall configuration of a liquid crystal display device according to a first embodiment. This liquid crystal display device is configured by two insulating glass substrates. One of the glass substrates is called an array substrate, and the other glass substrate is called a counter substrate. The array substrate and the counter substrate are pasted to each other, for example, by a seal material. An area of the array substrate is larger than an area of the counter substrate. Accordingly, in a region on the array substrate, there exists a picture-frame region 6, which is a region not opposed to the counter substrate. Moreover, in the present specification, a region where the array substrate and the counter substrate are perfectly opposed (region with reference sign 5 in FIG. 2) is referred to as a "display region".

As shown in FIG. 2, this liquid crystal display device functionally includes an image display portion 10, a gate driver (scanning signal line drive circuit) 20, a source driver (video signal line drive circuit) 30, and a display control circuit 40. The image display portion 10 and the gate driver 20 are provided in the display region 5. That is, the image display portion 10 and the gate driver 20 are monolithically formed on the array substrate. The source driver 30 is provided, for example, in a form of an IC chip in the picture-frame region 6. The display control circuit 40 is, for example, provided on a substrate different from the two glass substrates.

In the image display portion 10, a plurality of gate bus lines (scanning signal lines) GL, a plurality of source bus lines (video signal lines) SL, and a plurality of connection control lines (not shown in FIG. 2) described later are arranged. Moreover, in the image display portion 10, a plurality of pixel formation portions each configured to form a pixel are provided in matrix (not shown in FIG. 2). Note that a more detailed configuration of the image display portion 10 will be described later.

The display control circuit 40 receives an image signal DAT and a timing signal group TG such as a horizontal synchronizing signal, a vertical synchronizing signal, and the like, which are sent from an external source, and outputs a digital video signal DV, a source control signal SCTL for controlling operation of the source driver 30, a gate control signal GCTL for controlling operation of the gate driver 20, and a connection control signal SEL described later. Note that the gate control signal GCTL includes a gate start pulse signal and a gate clock signal, and the source control signal SCTL includes a source start pulse signal, a source clock signal, and a latch strobe signal.

The gate driver 20 repeats application of an active scanning signal to each of the gate bus lines GL with one vertical scanning period as a cycle, based on the gate control signal GCTL sent from the display control circuit 40.

The source driver 30 applies a video signal to each of the source bus lines SL in a time division manner, based on the digital video signal DV and the source control signal SCTL, which are sent from the display control circuit 40. At this time, the source driver 30 sequentially holds the digital video signal DV indicating a data voltage to be applied to each of the source bus lines SL at timing when a pulse of the source clock signal is generated. Then, the held digital video signal DV is converted into an analog voltage (data voltage) at timing when a pulse of the latch strobe signal is generated. The converted analog voltages are simultaneously applied to all the source bus lines SL as the video signals for driving.

By applying the scanning signals to the gate bus lines GL and applying the video signals to the source bus lines SL in the above-described manner, an image based on the image data DAT sent from the external source is displayed in the image display portion 10.

<1.2 Detailed Configuration of Image Display Portion and Picture-Frame Region>

Figure 3:
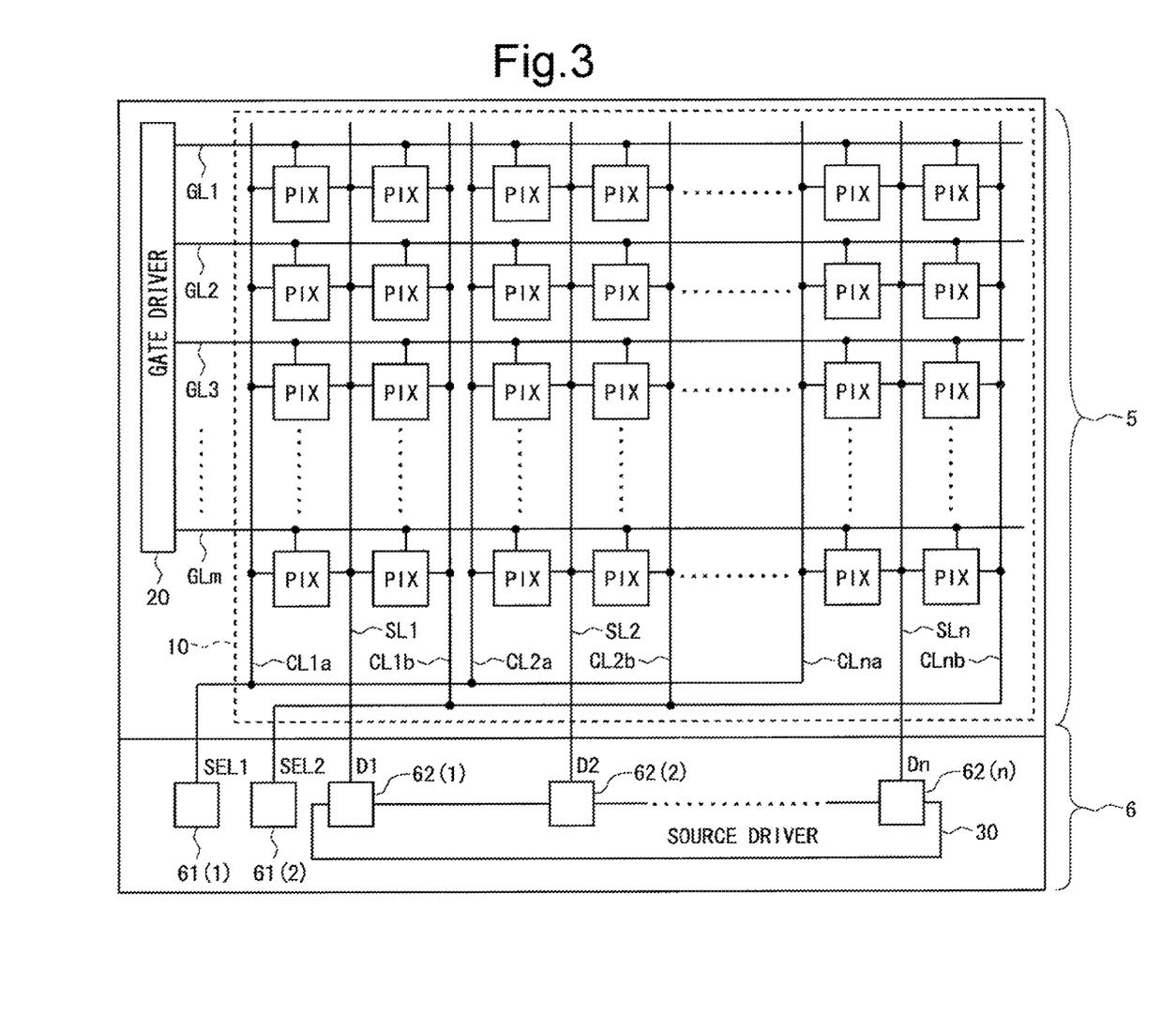
FIG. 3 is a diagram showing a configuration of an image display portion and a picture-frame region in the first embodiment.

Next, referring to FIGS. 1, 3, and 4, a detailed configuration of the image display portion 10 and the picture-frame region 6 will be described. In the image display portion 10, as shown in FIG. 3, m gate bus lines GL1 to GLm, n source bus lines SL1 to SLn, and 2n connection control lines CL1a to CLna, CL1b to CLnb are arranged. Moreover, in the image display portion 10, as shown in FIG. 3, (m×2n) pixel formation portions PIX are provided in matrix.

Figure 4:
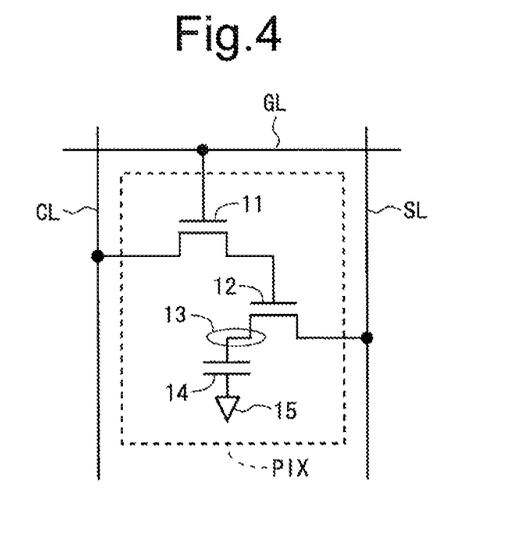
FIG. 4 is a circuit diagram showing a configuration of one pixel formation portion in the first embodiment.

FIG. 4 is a circuit diagram showing a configuration of one pixel formation portion PIX. As shown in FIG. 4, the pixel formation portion PIX includes a pixel electrode 13, a pixel transistor 11 configured to control application of the video signal to the pixel electrode 13, a connection control transistor 12 configured to control an electrical connection state between a corresponding source bus line SL and the pixel electrode 13, a common electrode 15 provided commonly to all the pixel formation portions PIX in the image display portion 10, and a liquid crystal capacitance 14 formed by the pixel electrode 13 and the common electrode 15. The pixel transistor 11 and the connection control transistor 12 are n-channel TFTs (Thin Film Transistors). With regard to the pixel transistor 11, a gate terminal is connected to a corresponding gate bus line GL, a drain terminal is connected to a corresponding connection control line CL, and a source terminal is connected to a gate terminal of the connection control transistor 12. With regard to the connection control transistor 12, the gate terminal is connected to the source terminal of the pixel transistor 11, a drain terminal is connected to the pixel electrode 13, and a source terminal is connected to the corresponding source bus line SL.

In the present embodiment, as shown in FIG. 3, each of the source bus lines SL is connected to the two pixel formation portions PIX in each row in a pixel matrix. The pixel formation portions PIX included in odd-numbered columns of the pixel matrix are connected to the source bus lines SL on a right side in FIG. 3, and the pixel formation portions PIX included in even-numbered columns of the pixel matrix are connected to the source bus lines SL on a left side. Moreover, 2n pixel formation portions PIX included in each row of the pixel matrix are connected to a same gate bus line GL. With the above-described configuration, with regard to the (m×2n) pixel formation portions PIX, in the present embodiment, the two pixel formation portions PIX form one pixel group. The pixel group is formed corresponding to each intersection between the m gate bus lines GL1 to GLm and n source bus lines SL1 to SLn. That is, in the image display portion 10, the (m×n) pixel groups are formed.

Figure 1:
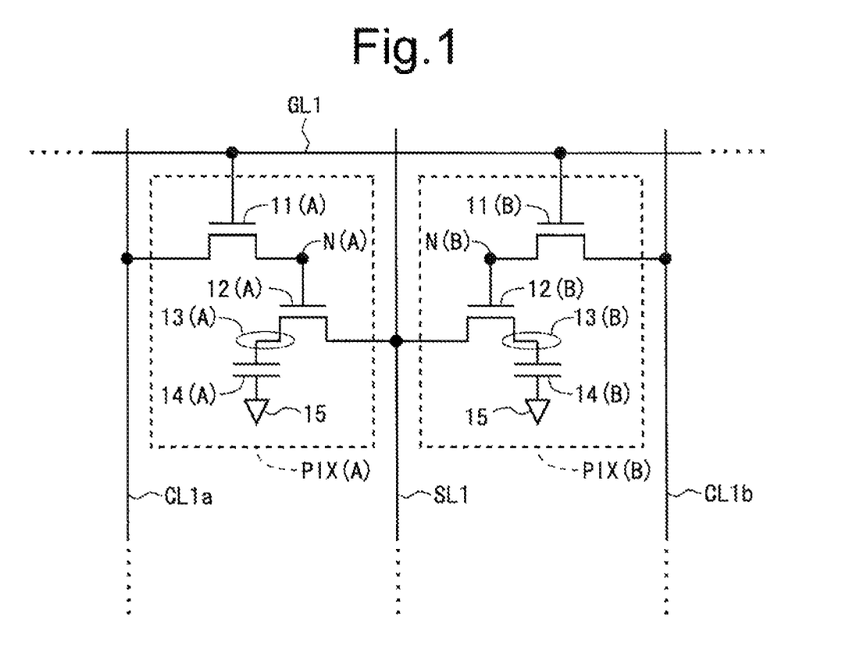
FIG. 1 is a circuit diagram showing a configuration of a pixel group in a first embodiment.

FIG. 1 is a circuit diagram showing a configuration of the pixel group corresponding to the intersection between the gate bus line GL1 and the source bus line SL1. "(A)" is added to reference signs of one of the two pixel formation portions included in this pixel group and components thereof, and "(B)" is added to reference signs of the other of the two pixel formation portions and components thereof. However, since the common electrode 15 is a component provided commonly to all the pixel formation portions PIX, "(A)" or "(B)" is not added to the reference sign of the common electrode 15. Moreover, with regard to the pixel formation portion PIX(A), a node between a source terminal of the pixel transistor 11(A) and a gate terminal of the connection control transistor 12(A) is denoted by reference sign N(A). Similarly, with regard to the pixel formation portion PIX(B), a node between a source terminal of the pixel transistor 11(B) and a gate terminal of the connection control transistor 12(B) is denoted by reference sign N(B).

A gate terminal of the pixel transistor 11(A) and a gate terminal of the pixel transistor 11(B) are both connected to the gate bus line GL1. A source terminal of the connection control transistor 12(A) and a source terminal of the connection control transistor 12(B) are both connected to the source bus line SL1. A drain terminal of the pixel transistor 11(A) and a drain terminal of the pixel transistor 11(B) are connected to different connection control lines CL. Specifically, the drain terminal of the pixel transistor 11(A) is connected to the connection control line CL1a, and the drain terminal of the pixel transistor 11(B) is connected to the connection control line CL1b.

Note that, while the configuration of the pixel group corresponding to the intersection between the gate bus line GL1 and the source bus line SL1 is shown in FIG. 1, configurations of the other pixel groups are the same.

In the present embodiment, as the connection control signal SEL, a first connection control signal SEL1 and a second connection control signal SEL2 are used. The first connection control signal SEL1 is supplied to the connection control lines CL1a to CLna, and the second connection control signal SEL2 is supplied to the connection control lines CL1b to CLnb. In accordance with this, a pad 61(1) for the first connection control signal SEL1 and a pad 61(2) for the second connection control signal SEL2 are provided in the picture-frame region 6. Moreover, video signals D1 to Dn are supplied to the source bus lines SL1 to SLn, respectively. In accordance with this, pads 62(1) to 62(n) for the video signals D1 to Dn are provided in the picture-frame region 6.

<1.3 Driving Method>

Figure 5:
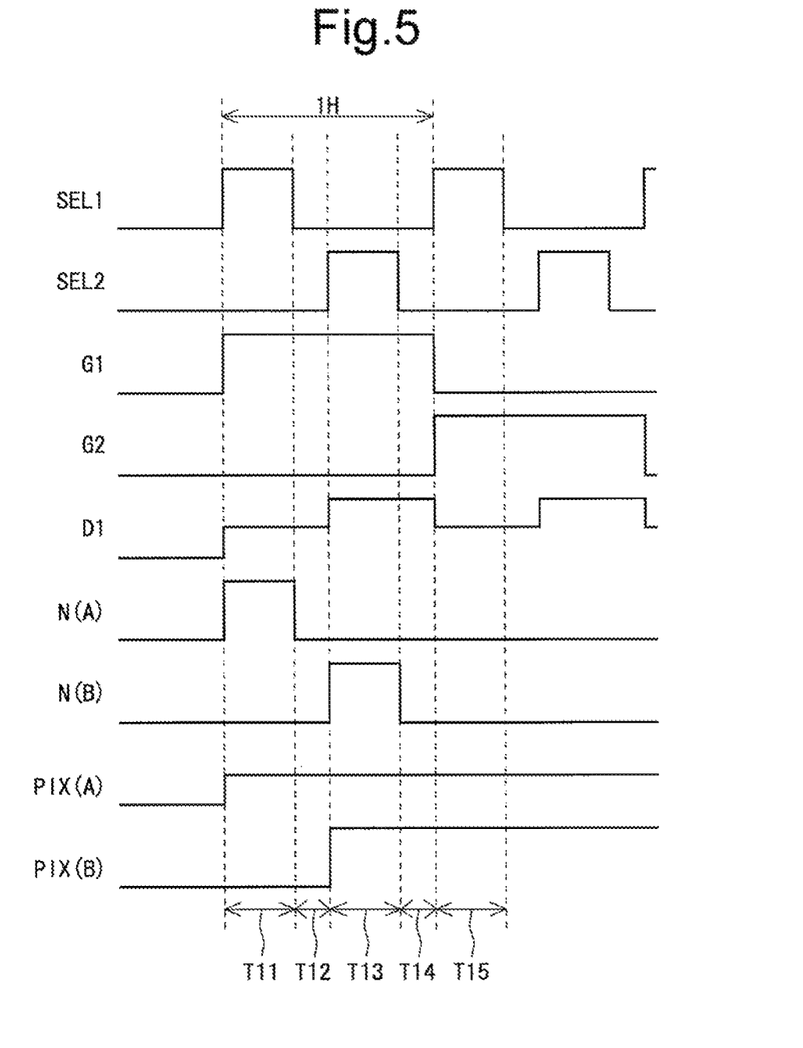
FIG. 5 is a timing chart for describing a driving method in the first embodiment.

Next, referring to a timing chart shown in FIG. 5, a driving method in the present embodiment will be described. Here, the pixel group (pixel formation portions PIX(A), PIX(B)) shown in FIG. 1 is focused on. A scanning signal G1 is supplied to the gate bus line GL1, the first connection control signal SEL1 is supplied to the connection control line CL1a, and the second connection control signal SEL2 is supplied to the connection control line CL1b. Note that waveforms of PIX(A), PIX(B) in FIG. 5 indicate charging potentials of liquid crystal capacitances 14(A), 14(B), respectively (it is true of FIG. 9).

In a period T11, the scanning signal G1 and the first connection control signal SEL1 become at a high level (active). The scanning signal G1 becomes at the high level, which brings the pixel transistor 11(A) and the pixel transistor 11(B) into an On state. At this time, while the second connection control signal SEL2 is at a low level, the first connection control signal SEL1 is at the high level. Accordingly, while a potential of the node N(B) in the pixel formation portion PIX(B) is kept at the low level, a potential of the node N(A) in the pixel formation portion PIX(A) becomes at the high level. This brings the connection control transistor 12(A) into an On state. As a result, the video signal D1 is applied to the pixel electrode 13(A), and the liquid crystal capacitance 14(A) is charged based on a data potential (a potential of the video signal D1) at this time.

In a period T12, the first connection control signal SEL1 becomes at the low level. At this time, since the scanning signal G1 is kept at the high level, the potential of the node N(A) becomes at the low level through the pixel transistor 11(A). This brings the connection control transistor 12(A) into an Off state.

In a period T13, in a state where the scanning signal G1 is kept at the high level, the second connection control signal SEL2 becomes at the high level. Since the scanning signal G1 is kept at the high level, the pixel transistor 11(A) and the pixel transistor 11(B) are kept in an On state. At this time, while the first connection control signal SEL1 is at the low level, the second connection control signal SEL2 is at the high level. Accordingly, while the potential of the node N(A) in the pixel formation portion PIX(A) is kept at the low level, the potential of the node N(B) in the pixel formation portion PIX(B) becomes at the high level. This brings the connection control transistor 12(B) into an On state. As a result, the video signal D1 is applied to the pixel electrode 13(B), and the liquid crystal capacitance 14(B) is charged based on a data potential (a potential of the video signal D1) at this time. Here, by differentiating the data potential in the period T13 from the data potential in the period T11, desired charging can be performed to the two pixel formation portions PIX(A), PIX(B) by the video signal D1 applied to the one source bus line SL1

In a period T14, the second connection control signal SEL2 becomes at the low level. At this time, since the scanning signal G1 is kept at the high level, the potential of the node N(B) becomes at the low level through the pixel transistor 11(B). This brings the connection control transistor 12(B) into an Off state.

In a period T15, the scanning signal G1 becomes at the low level. This brings the pixel transistor 11(A) and the pixel transistor 11(B) into an Off state. Note that in the period T15 and later, operation similar to the foregoing is performed in the pixel groups included in the second row and later of the pixel matrix.

<1.4 Effect>

Figure 6:
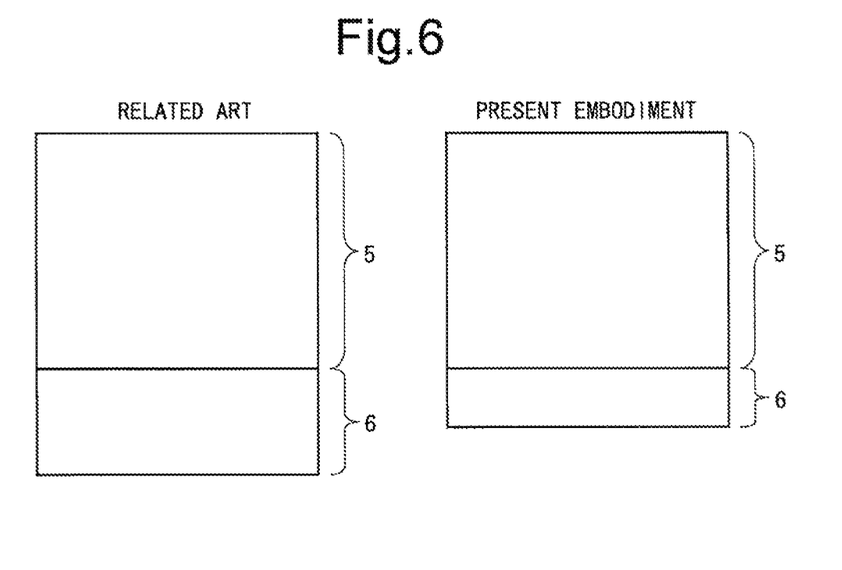
FIG. 6 is a diagram for describing an effect in the first embodiment.

According to the present embodiment, the two pixel formation portions PIX form the one pixel group, and the two pixel formation portions PIX forming each of the pixel groups are connected to a same source bus line SL. Moreover, each of the pixel formation portions PIX includes the connection control transistor 12 configured to control the electrical connection state between a corresponding source bus line SL and the pixel electrode 13. In such a configuration, an On/Off state of the connection control transistor 12 is controlled by the connection control signal SEL supplied through the pixel transistor 11. With regard to this, the different connection control signals SEL are supplied to the two pixel formation portions PIX forming each of the pixel groups. Thereby, the two connection control transistors 12 included in the two pixel formation portions PIX forming each of the pixel groups become an On state in the periods different from each other. This allows the desired charging to be performed to the two pixel formation portions PIX forming each of the pixel groups by the video signal applied to one source bus line SL. Here, the connection control transistors 12 configured to assign the video signal applied to the one source bus line SL to the two pixel formation portions PIX are provided inside the display region 5, and no transistor (switching element) configured to assign the video signal is provided in the picture-frame region 6. Moreover, as the signals for assigning the video signal, only the two connection control signals SEL (first connection control signal SEL1 and second connection control signal SEL2) in total are used, and only the two pads are required to be provided in the picture-frame region 6 for these two connection control signals SEL regardless of resolution. From the foregoing, with regard to the liquid crystal display device configured to perform time-division driving of the source bus lines SL, the picture-frame region 6 can be made narrower than that in the related art, as shown in FIG. 6. That is, the high resolution of the liquid crystal display device can be realized without deteriorating the freedom degree of design. As described above, according to the present embodiment, with regard to the liquid crystal display device, narrowing of the picture-frame region 6 can be realized so that the freedom degree of design is improved.

2. Second Embodiment

<2.1 Outline and Overall Configuration>

In the first embodiment, the two pixel formation portions PIX form the one pixel group. In contrast, in the present embodiment, four pixel formation portions PIX form one pixel group. An overall configuration is similar to that of the first embodiment, and thus, description thereof is omitted (see FIG. 2).

<2.2 Detailed Configuration of Image Display Portion and Picture-Frame Region>

Figure 7:
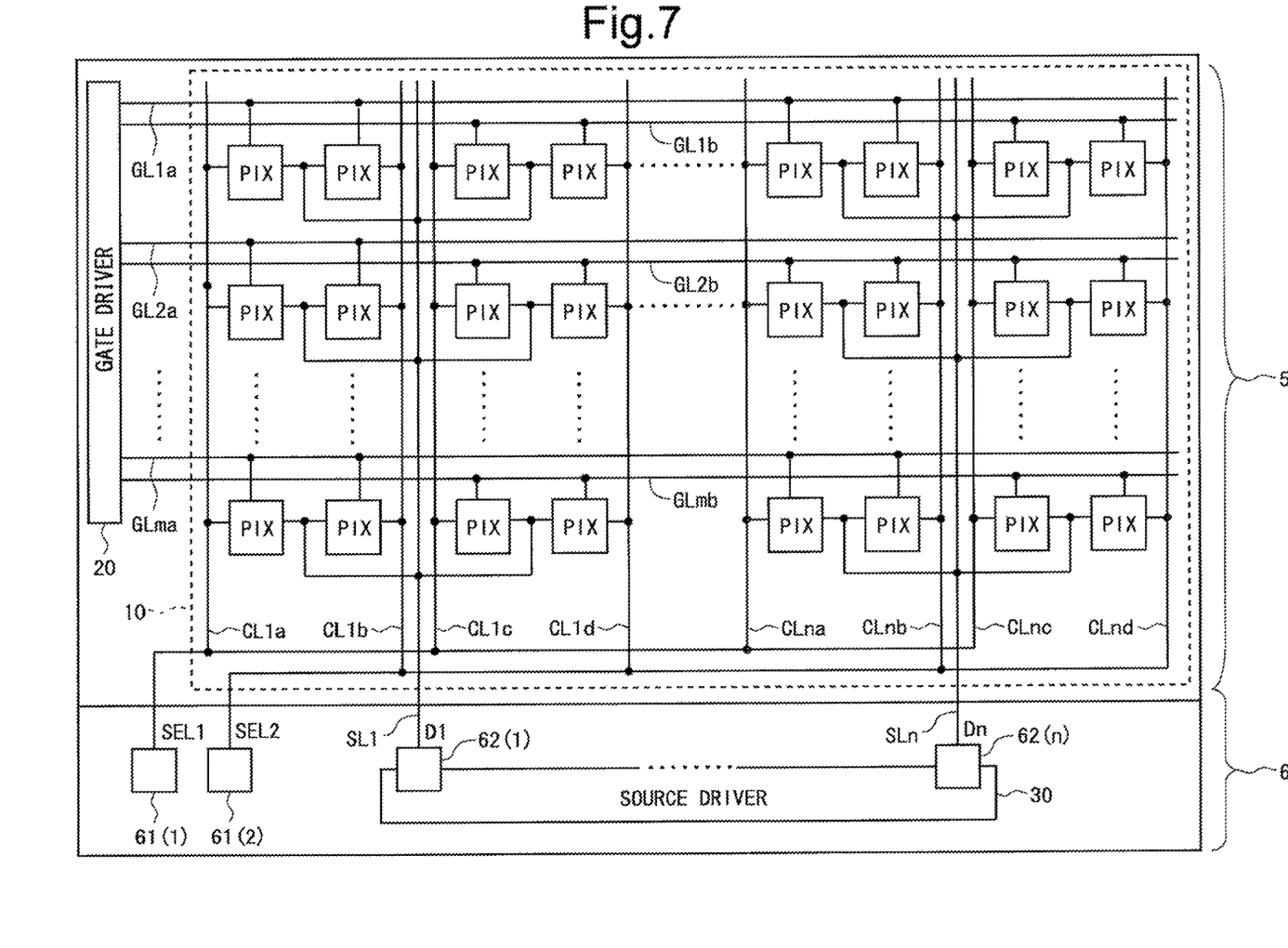
FIG. 7 is a diagram showing a configuration of an image display portion and a picture-frame region in a second embodiment.

Next, referring to FIGS. 4, 7, and 8, a detailed configuration of the image display portion 10 and the picture-frame region 6 will be described. In the present embodiment, in the image display portion 10, as shown in FIG. 7, 2m gate bus lines GL1a to GLma, GL1b to GLmb, n source bus lines SL1 to SLn, and 4n connection control lines CL1a to CLna, CL1b to CLnb, CL1c to CLnc, and CL1d to CLnd are arranged. Moreover, in the image display portion 10, as shown in FIG. 7, (m×4n) pixel formation portions PIX are provided in matrix. An internal configuration of each of the pixel formation portions PIX is similar to that of the first embodiment (see FIG. 4).

In the present embodiment, as shown in FIG. 7, each of the source bus lines SL is connected to the four pixel formation portions PIX forming the one pixel group in each row of the pixel matrix. With regard to each of the pixel groups, two of the four pixel formation portions PIX are located on a left side in FIG. 7 with respect to the corresponding source bus line SL, and the remaining two of the four pixel formation portions PIX are located on a right side in FIG. 7 with respect to the corresponding source bus line SL. However, a positional relationship between the source bus line SL and the pixel formation portions PIX is not limited to this. Moreover, with regard to each of the pixel groups, two pixel formation portions PIX located on the left side with respect to the source bus line SL and the two pixel formation portions PIX located on the right side with respect to the source bus line SL are connected to different gate bus lines GL.

Figure 8:
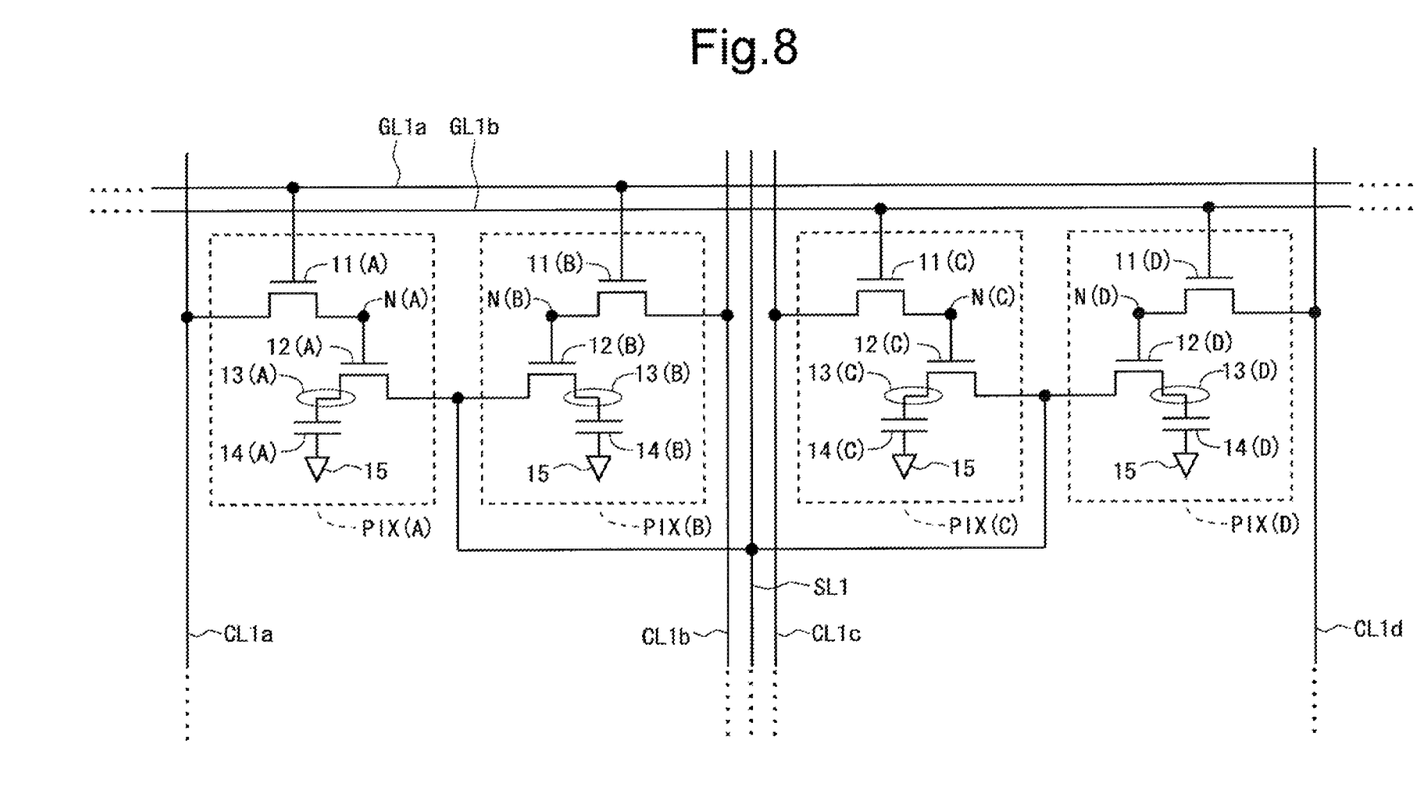
FIG. 8 is a circuit diagram showing a configuration of a pixel group in the second embodiment.

FIG. 8 is a circuit diagram showing a configuration of the pixel group corresponding to two gate bus lines GL1a, GL1b, and a source bus line SL1. Note that "(A) to "(D)" are added to reference signs of the four pixel formation portions included in this pixel group, respectively (it is true of the components thereof).

The gate terminal of the pixel transistor 11(A) and the gate terminal of the pixel transistor 11(B) are connected to the gate bus line GL1a. A gate terminal of a pixel transistor 11(C) and a gate terminal of a pixel transistor 11(D) are connected to the gate bus line GL1b. Source terminals of the connection control transistors 12(A) to 12(D) are all connected to the source bus line SL1. Drain terminals of the pixel transistors 11(A) to 11(D) are connected to connection control lines CL different from one another. Specifically, the drain terminal of the pixel transistor 11(A) is connected to the connection control line CL1a, the drain terminal of the pixel transistor 11(B) is connected to the connection control line CL1b, the drain terminal of the pixel transistor 11(C) is connected to the connection control line CL1c, and the drain terminal of the pixel 11(D) is connected to the connection control line CL1d.

Note that while a configuration of the pixel group corresponding to the two gate bus lines GL1a, GL1b and the source bus line SL1 is shown in FIG. 8, configurations of the other pixel groups are the same.

In the present embodiment, as in the first embodiment, as the connection control signal SEL, the first connection control signal SEL1 and the second connection control signal SEL2 are used. The first connection control signal SEL1 is supplied to the connection control lines CL1a to CLna, CL1c to CLnc, and the second connection control signal SEL2 is supplied to the connection control lines CL1b to CLnb, CL1d to CLnd. In accordance with this, a pad 61(1) for the first connection control signal SEL1 and a pad 61(2) for the second connection control signal SEL2 are provided in the picture-frame region 6. Moreover, video signals D1 to Dn are supplied to the source bus lines SL1 to SLn, respectively. In accordance with this, pads 62(1) to 62(n) for the video signals D1 to Dn are provided in the picture-frame region 6.

<2.3 Driving Method>

Figure 9:
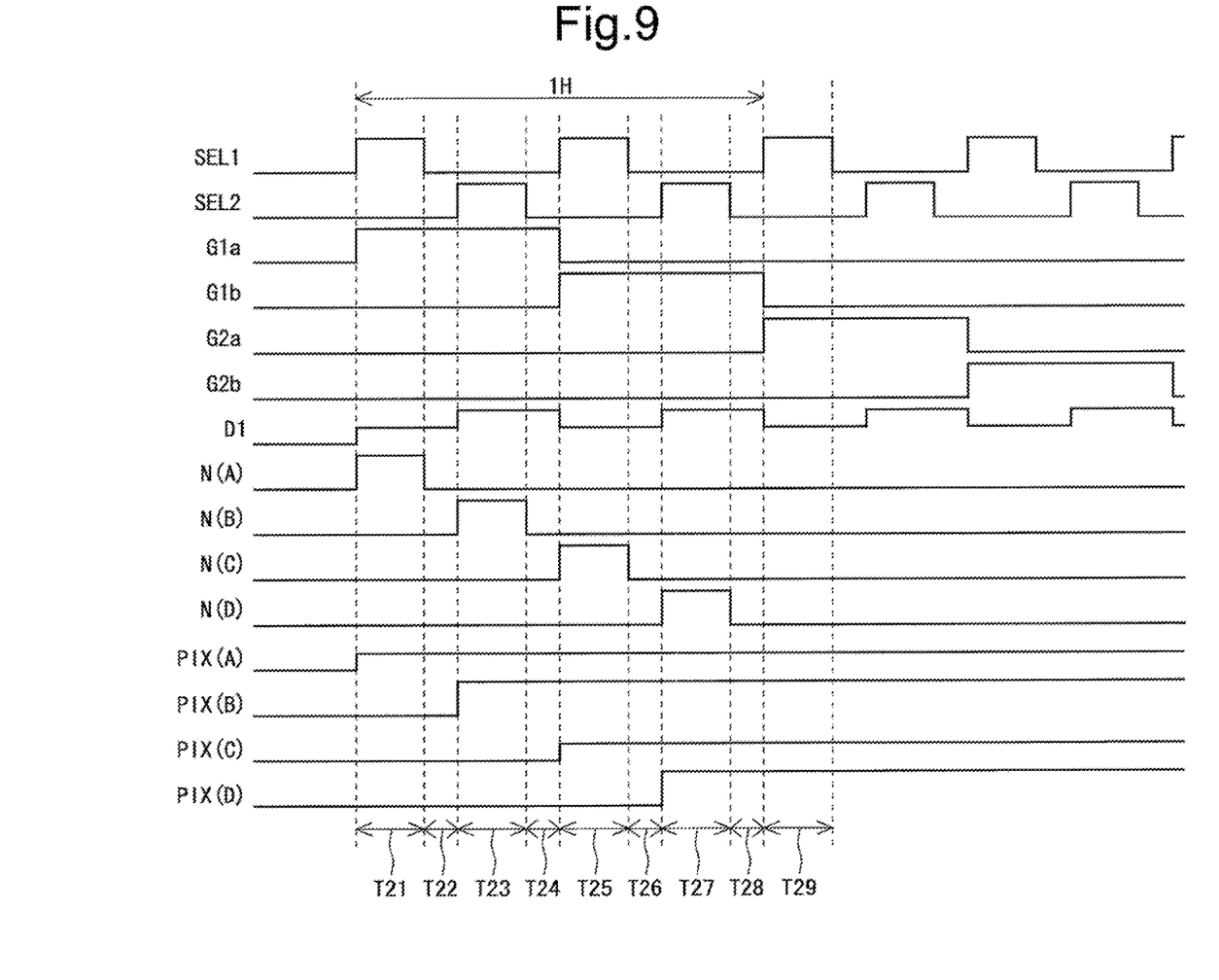
FIG. 9 is a timing chart for describing a driving method in the second embodiment.

Next, referring to a timing chart shown in FIG. 9, a driving method in the present embodiment will be described. Here, the pixel group (pixel formation portions PIX(A) to PIX(D)) shown in FIG. 8 is focused on. A scanning signal G1a is supplied to the gate bus line GL1a, a scanning signal G1b is supplied to the gate bus line GL1b, the first connection control signal SEL1 is supplied to the connection control lines CL1a, CL1c, and the second connection control signal SEL2 is supplied to the connection control lines CL1b, CL1d.

In a period T21, the scanning signal G1a and the first connection control signal SEL1 become at a high level (active). The scanning signal G1a becomes at the high level, which brings the pixel transistor 11(A) and the pixel transistor 11(B) into an On state. At this time, while the second connection control signal SEL2 is at a low level, the first connection control signal SEL1 is at the high level. Accordingly, while a potential of the node N(B) in the pixel formation portion PIX(B) is kept at the low level, a potential of the node N(A) in the pixel formation portion PIX(A) becomes at the high level. This brings the connection control transistor 12(A) into an On state. As a result, the video signal D1 is applied to the pixel electrode 13(A), and the liquid crystal capacitance 14(A) is charged based on a data potential (a potential of the video signal D1) at this time.

In a period T22, the first connection control signal SEL1 becomes at the low level. At this time, since the scanning signal G1a is kept at the high level, the potential of the node N(A) becomes at the low level through the pixel transistor 11(A). This brings the connection control transistor 12(A) into an Off state.

In a period T23, in a state where the scanning signal G1a is kept at the high level, the second connection control signal SEL2 becomes at the high level. Since the scanning signal G1a is kept at the high level, the pixel transistor 11(A) and the pixel transistor 11(B) are kept in an On state. At this time, while the first connection control signal SEL1 is at the low level, the second connection control signal SEL2 is at the high level. Accordingly, while the potential of the node N(A) in the pixel formation portion PIX(A) is kept at the low level, the potential of the node N(B) in the pixel formation portion PIX(B) becomes at the high level. This brings the connection control transistor 12(B) into an On state. As a result, the video signal D1 is applied to the pixel electrode 13(B), and the liquid crystal capacitance 14(B) is charged based on a data potential (a potential of the video signal D1) at this time.

In a period T24, the second connection control signal SEL2 becomes at the low level. At this time, since the scanning signal G1a is kept at the high level, the potential of the node N(B) becomes at the low level through the pixel transistor 11(B). This brings the connection control transistor 12(B) into an Off state.

In a period T25, the scanning signal G1a becomes at the low level. This brings the pixel transistor 11(A) and the pixel transistor 11(B) into an Off state. Moreover, in periods T25 to T28, the scanning signal G1b is at the high level. Thereby, in the periods T25 to T28, in the pixel formation portions PIX(C), PIX(D), operation similar to that of the pixel formation portions PIX(A), PIX(B) in the periods T21 to T24 is performed.

In a period T29 and later, operation similar to the foregoing is performed in the pixel groups included in the second rows and later of the pixel matrix.

By differentiating the data potential in the period T21, the data potential in the period T23, the data potential in the period T25, and the data potential in the period T27 from one another, desired charging can be performed to the four pixel formation portions PIX(A) to PIX(D) by the video signal D1 applied to one source bus line SL1.

<2.4 Effects>

According to the present embodiment, the four pixel formation portions PIX form the one pixel group, and the four pixel formation portions PIX forming each of the pixel groups are connected to a same source bus line SL. With regard to the four pixel formation portions PIX forming each of the groups, the different scanning signals are supplied to the two pixel formation portions PIX and the remaining two pixel formation portions PIX. Moreover, each of the pixel formation portions PIX includes the connection control transistor 12 configured to control the electrical connection state between a corresponding source bus line SL and the pixel electrode 13. In such a configuration, an On/Off state of the connection control transistor 12 is controlled by the connection control signal SEL supplied through the pixel transistor 11. Here, in the four pixel formation portions PIX forming each of the pixel groups, combinations of the supplied scanning signal and the connection control signal are different from one another. Thereby, the four connection control transistors 12 included in the four pixel formation portions PIX forming each of the pixel groups become an On state in the periods different from one another. This allows the desired charging to be performed to the four pixel formation portions PIX forming each of the pixel groups by the video signal applied to one source bus line SL. Here, the connection control transistors 12 configured to assign the video signal applied to one source bus line SL to the four pixel formation portions PIX are provided in the display region 5, and no transistor (switching element) configured to assign the video signal is provided in the picture-frame region 6. Moreover, as in the first embodiment, as the signals for assigning the video signal, only the two connection control signals SEL (first connection control signal SEL1 and second connection control signal SEL2) in total are used, and only the two pads are required to be provided in the picture-frame region 6 for those two connection control signals SEL regardless of resolution. From the foregoing, as in the first embodiment, with regard to the liquid crystal display device, narrowing of the picture-frame region 6 can be realized so that the freedom degree of design is improved.

3. Modification

In the first embodiment, the configuration shown in FIG. 3 is employed, and the respective video signals are assigned to the two pixel formation portions PIX in each of the horizontal scanning periods. In the second embodiment, the configuration shown in FIG. 7 is employed, and the respective video signals are assigned to the four pixel formation portions PIX in each of the horizontal scanning periods. However, the present invention is not limited thereto. For example, the configuration may be such that three pixel formation portions PIX form one pixel group and the respective video signals are assigned to the three pixel formation portions PIX in each of the horizontal scanning periods, or the configuration may be such that five or more pixel formation portions PIX form one pixel group and the respective video signals are assigned to the relevant five or more pixel formation portions PIX in each of the horizontal scanning periods.

Moreover, the two gate bus lines GL are provided in each row of the pixel matrix in the second embodiment. However, for example, by supplying the four connection control signals different from one another to the four pixel formation portions PIX forming each of the pixel groups, the respective video signals can be assigned to the four pixel formation portions PIX in each of the horizontal scanning periods, even when only one gate bus line GL is provided in each row of the pixel matrix.

When the foregoing is generalized, the following configuration can be employed.

The plurality of pixel formation portions PIX in the image display portion 10 are grouped so that each of the pixel groups is formed by K pixel formation portions PIX, where K is an integer of two or more.

The K pixel formation portions PIX forming each of the pixel groups are connected to a same source bus line SL.

Control terminals of the K pixel transistors 11 included in the K pixel formation portions PIX forming each of the pixel groups are connected to J gate bus lines GL so that (K/J) pixel formation portions PIX correspond to one gate bus line GL.

As the connection control signal SEL, (K/J) connection control signals SEL, which become active at timing different from one another, are prepared.

With regard to the K pixel transistors 11 included in the K pixel formation portions PIX forming each of the pixel groups, the first conduction terminals of the (K/J) pixel transistors 11 connected to a same gate bus line GL are connected to connection control signal lines configured to transmit the connection control signals SEL different from one another.

4. Others

Although the case where the pixel formation portions PIX are arranged in matrix in the rectangular display region 5 has been exemplified and described in each of the above-described embodiments, the present invention is not limited thereto. The present invention can also be applied to a display device having a display region in a shape other than a rectangular shape. Thereby, the freedom degree of design is improved, for example, when the display device for vehicle is realized.

Moreover, although the case where the n-channel TFTs are employed as the pixel transistor 11 and the connection control transistors 12 has been exemplified and described in each of the above-described embodiments, the present invention can also be applied to a case where p-channel TFTs are employed.

Furthermore, although the liquid crystal display device has been exemplified and described in each of the above-described embodiments, the present invention is not limited thereto. The present invention can also be applied to other display devices such as an organic EL display device and the like.

While the present invention has been described in detail above, the above description is to be considered in all respects as illustrative and not restrictive. It will be understood that many other changes and modifications can be made without departing from the scope of the present invention.

What is claimed is:

1. A display device comprising: a plurality of video signal lines; a plurality of scanning signal lines intersecting with the plurality of video signal lines; an image display portion including a plurality of pixel formation portions each connected to one of the plurality of video signal lines and one of the plurality of scanning signal lines; a video signal line drive circuit configured to apply video signals to the plurality of video signal lines; and a scanning signal line drive circuit configured to apply scanning signals to the plurality of scanning signal lines, wherein the plurality of pixel formation portions are grouped so that K pixel formation portions form each pixel group, where K is an integer of two or more, the K pixel formation portions forming each of the pixel groups are connected to the same video signal line, each of the pixel formation portions includes:
  a pixel electrode as one of electrodes forming a capacitance; and
  a connection control transistor configured to control an electrical connection state between a corresponding video signal line and the pixel electrode, K connection control transistors included in the K pixel formation portions forming each of the pixel groups become an On state in periods different from one another in each horizontal scanning period, and the video signal line drive circuit applies the video signals to each of the video signal lines in a time division manner in each horizontal scanning period.

2. The display device according to claim 1, wherein
the image display portion further includes a plurality of connection control signal lines configured to transmit connection control signals for controlling an On/Off state of the connection control transistors included in the plurality of pixel formation portions, each of the pixel formation portions further includes a pixel transistor having a control terminal connected to a corresponding scanning signal line, a first conduction terminal connected to a corresponding connection control signal line, and a second conduction terminal connected to a control terminal of the connection control transistor, and the connection control transistor has the control terminal connected to the second conduction terminal of the pixel transistor, a first conduction terminal connected to the pixel electrode, and a second conduction terminal connected to the corresponding video signal line.

3. The display device according to claim 2, wherein
the control terminals of K pixel transistors included in the K pixel formation portions forming each of the pixel groups are connected to a same scanning signal line, as the connection control signala, K connection control signals are prepared, the K connection control signals becoming active at timing different from one another, and the first conduction terminals of the K pixel transistors included in the K pixel formation portions forming each of the pixel groups are connected to the connection control signal lines configured to transmit the connection control signals different from one another.

4. The display device according to claim 2, wherein
the K is two, as the connection control signals, a first connection control signal and a second connection control signal that become active at different timing are prepared, and when two pixel formation portions forming each of the pixel groups are defined as a first pixel formation portion and a second pixel formation portion, with regard to each of the pixel groups,
  the control terminal of the pixel transistor included in the first pixel formation portion and the control terminal of the pixel transistor included in the second pixel formation portion are connected to a same scanning signal line,
  the first conduction terminal of the pixel transistor included in the first pixel formation portion is connected to a connection control signal line configured to transmit the first connection control signal, and the first conduction terminal of the pixel transistor included in the second pixel formation portion is connected to a connection control signal line configured to transmit the second connection control signal.

5. The display device according to claim 2, wherein the control terminals of the K pixel transistors included in the K pixel formation portions forming each of the pixel groups are connected to J scanning signal lines so that (K/J) pixel formation portions correspond to one scanning signal line, as the connection control signals, (K/J) connection control signals are prepared, the (K/J) connection control signals becoming active at timing different from one another, and with regard to the K pixel transistors included in the K pixel formation portions forming each of the pixel groups, the first conduction terminals of (K/J) pixel transistors connected to a same scanning signal line are connected to the connection control signal lines configured to transmit the connection control signals different from one another.

6. The display device according to claim 2, wherein the K is four, as the connection control signals, a first connection control signal and a second connection control signal that become active at different timing are prepared, and when the four pixel formation portions forming each of the pixel groups are defined as a first pixel formation portion, a second pixel formation portion, a third pixel formation portion, and a fourth pixel formation portion, with regard to each of the pixel groups, the control terminal of the pixel transistor included in the first pixel formation portion and the control terminal of the pixel transistor included in the second pixel formation portion are connected to a same scanning signal line, the control terminal of the pixel transistor included in the third pixel formation portion and the control terminal of the pixel transistor included in the fourth pixel formation portion are connected to a same scanning signal line, the control terminal of the pixel transistor included in the first pixel formation portion and the control terminal of the pixel transistor included in the third pixel formation portion are connected to different scanning signal lines, the first conduction terminal of the pixel transistor included in the first pixel formation portion and the first conduction terminal of the pixel transistor included in the third pixel formation portion are connected to a connection control signal line configured to transmit the first connection control signal, and the first conduction terminal of the pixel transistor included in the second pixel formation portion and the first conduction terminal of the pixel transistor included in the fourth pixel formation portion are connected to a connection control signal line configured to transmit the second connection control signal.

\* \* \* \* \*